United States Patent Office 2,742,126
Patented Apr. 17, 1956

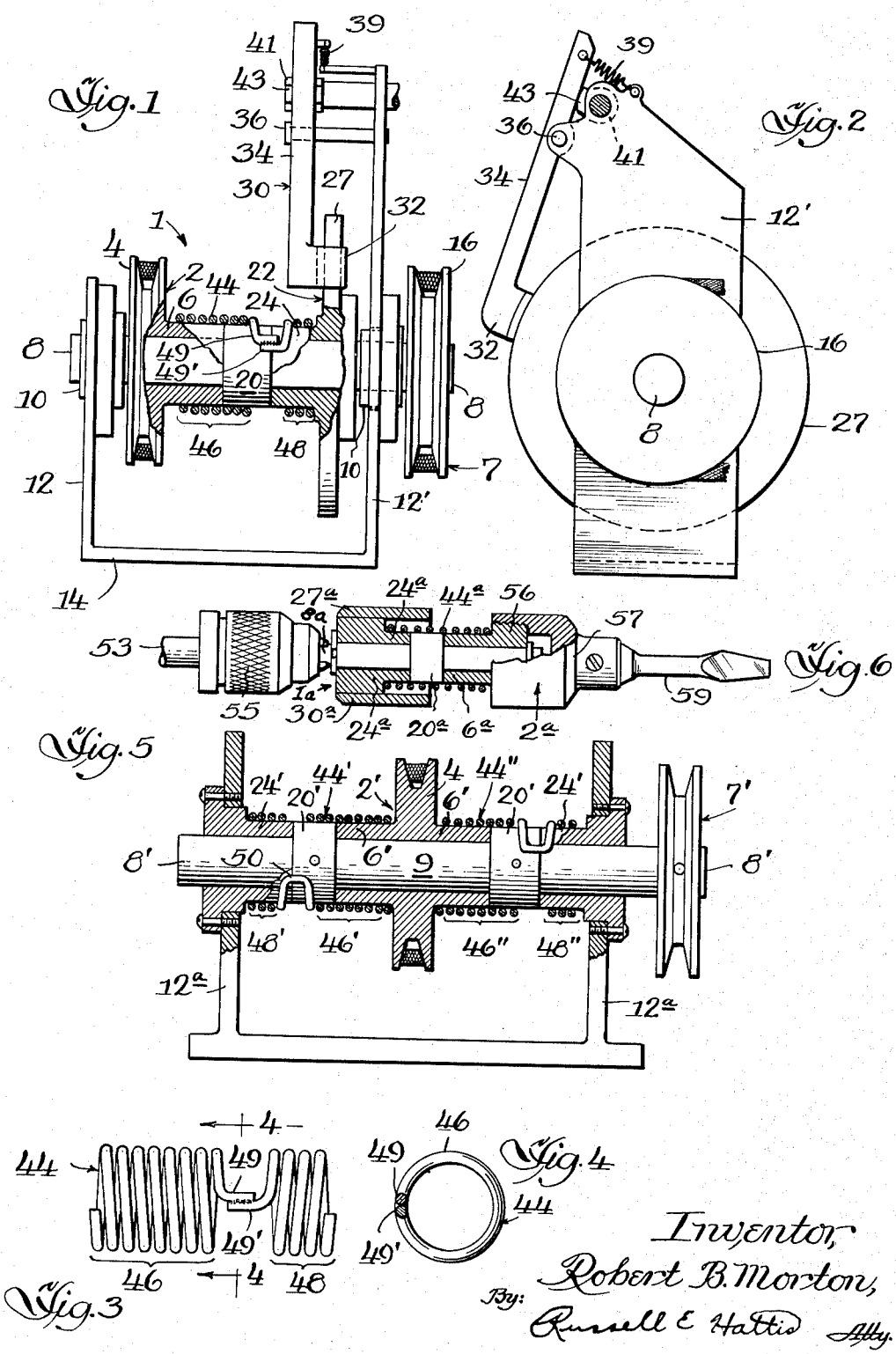

2,742,126

UNIDIRECTIONAL CLUTCH MECHANISM

Robert B. Morton, Chicago, Ill.

Application March 1, 1955, Serial No. 491,495

11 Claims. (Cl. 192—41)

This invention relates to clutch mechanism utilizing a spirally wound clutch spring for coupling two rotatably mounted parts together; more particularly it relates to an improvement in such clutch mechanism wherein it is adjustable or initially constructed to form a unidirectional clutch, the two rotatable parts being coupled together when rotation is imparted to one of the rotatable parts but are uncoupled when rotation is imparted in either direction to the other rotatable part. Such unidirectional clutches find use in all types of machinery, such as washing machines, moving picture projector machines, outboard motors, automatic thread tapping machines, reverse drive transmissions, and in numerous other apparatus where it is desirable to selectively decouple a driven shaft from a drive shaft without shifting of gears.

Although unidirectional spring clutches performing the aforementioned functions are old in the art, the prior constructions have numerous disadvantages, such as being expensive to construct because of the number and/or arrangement of their parts, or requiring parts made to close tolerances for smooth, reliable operation.

It is one of the objects of this invention to provide a relatively inexpensive unidirectional spring clutch mechanism wherein the parts making up the clutch mechanism are simply constructed and arranged for efficient mass production, and wherein the sizes of the parts need not be made to very close tolerances for smooth, reliable operation.

It is another object of this invention to provide a unidirectional clutch of the type above described wherein the clutch spring is of substantially uniform diameter and is mounted on cylindrical drum surfaces of approximately the same diameter along the entire length of the spring.

An additional object of the invention is to provide a unidirectional clutch including a clutch spring wrapped around the rotatable parts to be coupled together and also around a stationary breaking or control surface, eliminating the necessity of mounting the spring closely within internal brake-forming recesses formed in stationary parts of the associated structure as in some types of prior unidirectional clutch mechanisms.

Another object of the invention is to provide a unidirectional clutch mechanism which includes a simply and economically constructed control member by means of which one rotatable part may drive to another rotatable part, and wherein the latter part when rotated from some other source may selectively drive or overrun the first-mentioned rotatable part without necessitating the shifting of gears or the like.

A still further object of the invention is to provide a clutch mechanism for coupling one rotatable part to another in either direction of rotation of one rotatable part, and wherein rotation imparted from some other source to the second-mentioned rotatable part is not imparted to the first-mentioned rotatable part in either direction of rotation of the second rotatable part.

In accordance with a preferred form of the invention, the unidirectional clutch mechanism uses a clutch spring of uniform diameter and formed of two oppositely wound interconnected spring sections. One of the spring sections surrounds adjacent rotatably mounted shaft clutch drums of approximately the same diameter, and the oppositely wound spring section surrounds a stationary clutch drum of approximately the same diameter as said other drum. The two reversely wound sections of the spring are preferably initially fabricated as separate spring parts, the ends of which are later welded together to form a single integral clutch spring. Rotation of one of the shafts in the direction which contracts the spring will be imparted to the other shaft, and rotation of the same in the opposite direction, or rotation of said other shaft in either direction will not be imparted to the drive shaft. With this construction, the spring and the drum surfaces need not be made to close tolerances for smooth, reliable operation, and the clutch parts may be efficiently mass produced and assembled.

In accordance with another form of the invention, the aforementioned stationary clutch spring receiving drum forms a part of an adjustable control member which may be freed for rotation so that two rotatable shafts may be coupled together irrespective of which shaft acts as a drive shaft, or may be locked from rotation so that one shaft is uncoupled from the other shaft. It can be seen that by alternately locking and unlocking the control member from rotation, the speed reduction or lost motion functions may be performed.

Another aspect of the invention includes the provision of two separate clutch spring receiving sections on the two rotatable shafts of the transmission, and respective clutch springs of the type above described surrounding the two sections of the shafts. One of the clutch springs is wound in a direction which will transmit motion to the driven shaft in one direction of rotation of the drive shaft, and the other clutch spring is wound in a direction which will transmit motion to the driven shaft in the opposite direction of rotation of the drive shaft. Thus, rotation of the drive shaft is coupled to the driven shaft in both directions of rotation of the drive shaft while the driven shaft is uncoupled from the drive shaft when driven by means other than said drive shaft.

These and other objects, advantages and features of the invention will become apparent upon making reference to the specification to follow and the drawings showing two exemplary embodiments of the invention.

In the drawings:

Fig. 1 is an elevational view, partially in section, of mechanism incorporating the features of one form of the invention;

Fig. 2 is an end view of the clutch mechanism of Fig. 1;

Fig. 3 is an enlarged elevational view of the clutch spring in Fig. 1;

Fig. 4 is a section through the clutch spring, taken along section line 4—4 of Fig. 3;

Fig. 5 is a section through a modified form of the invention; and

Fig. 6 is a view, partly in section, of an electric screw driver utilizing the clutch of the invention.

For sake of simplicity of explanation, applicant will refer to the shaft member which is always coupled to the other shaft member of the transmission in at least one direction of rotation thereof as the drive shaft, and will refer to the other shaft member as the driven shaft, even though in certain applications the driven shaft may act as a drive shaft driven from a source other than the so-called drive shaft.

Refer now to the embodiment of the invention illustrated in Figs. 1 through 4.

This clutch mechanism 1 includes a driver assembly 2 comprising a belt-receiving wheel 4 and a hollow cylindrical clutch hub or drum 6 rigidly secured in any desired manner to the wheel 4. The wheel 4 merely forms a convenient means for imparting rotation to the drive assembly, and may obviously be replaced by any other suitable motion coupling means.

The drive assembly is rotatably mounted upon a driven assembly 7 comprising a shaft 8 journalled in spaced bearing bushings 10—10 mounted in stationary arms 12—12' of a bracket 14, and a driven belt-receiving wheel 16 rigidly secured to the projecting end of the driven shaft 8 extending beyond the bracket arm 12'. The belt carried by the driven wheel 16 transmits motion selectively to or from other rotatable parts, not shown, in a manner to be explained.

The left half of the driven shaft 8 rotatably supports the drive wheel 4 and clutch drum 6, the drum 6 extending from the side of the drive wheel 4 facing the bracket arm 12'. The driven shaft 8 includes an enlarged cylindrical clutch drum forming portion 20 having approximately the same diameter as the clutch drum 6 of the drive assembly. The clutch drums 6 and 20 are contiguous to one another and are centered about the axis of rotation of the shaft 8.

Also rotatably mounted upon the driven shaft 8 is a control member 22 which, in a manner to be explained, selectively couples and uncouples the driven assembly 7 from the drive assembly 2. The control member 22 is mounted adjacent the right hand bracket arm 12' and includes a hollow cylindrical drum 24 which surrounds the shaft 8 adjacent to the side of the driven assembly which is remote from the clutch drum 6 of the drive assembly. The hollow drum 24 is of approximately the same diameter as the other clutch drums 6 and 20, and is centered with respect to the axis of rotation of the latter.

Rigidly fixed to the hollow control member drum 24 is a large circular wheel portion 27 which together with the drum 24 is rotatably mounted upon the shaft 8. The control member 22 may be locked against rotation by means of a suitable friction brake mechanism 30 which includes a friction head 32 carried on the end of a lever arm 34 pivoted at 36 intermediate its ends. The friction head 32 is adapted to make frictional locking engagement with the periphery of the wheel portion 27 of the control member 22, and, by means of a spring 39, is normally urged out of contact with the control wheel 27. The friction head 32 is moved into locking engagement with the control wheel 26 by means of a rotatably mounted cam member 41 having a projecting portion 43 which may be cammed against the end of the lever arm 34 opposite the friction head end so as to press the friction head against the control wheel 27. The cam 41 may be manually controlled or operated or it may be driven by suitable automatic mechanism which rotates the projecting portion of the cam against the lever arm 34 at an appropriate time to perform certain predetermined control functions.

The drive and driven assemblies are coupled together under certain conditions by means of a clutch spring 44 which surrounds the drum surfaces 6, 20 and 24. The clutch spring has a substantially constant diameter which, however, is not critical. It is required that the spring internal diameter be somewhat smaller than the diameter of the aforementioned clutch-receiving drums so that the spring is press fitted thereover with a minimum amount of wrapping or initial tension.

The clutch spring has two oppositely wound portions 46 and 48, respectively. The clutch spring section 46 extends over only the drum surfaces 6 and 20 of the drive and driven assemblies. The spring section 48 extends around only the drum 24 of the control member. The two spring sections are preferably formed from two separate springs having welded together axially turned ends 49—49 in approximately the plane of the adjacent coiled spring portion.

The operation of the clutch mechanism 1 is as follows: When the drive wheel 4 is rotated in a direction which tends to contract the spring portion 46 around the drive assembly drum 6, which is a counter-clockwise direction as viewed from the left hand side of Fig. 1, the portion 46 of the clutch spring will also contract around the clutch drum 20 and thereby couple rotation to the driven shaft 8 and the attached driven wheel 16. Due to the reverse winding of the section 48 about the control member drum 46, this portion will tend to expand and thereby loosely surround the control member drum 24. Rotation of the drive wheel in the opposite direction will result in expansion of the clutch spring section 46 to thereby uncouple the driven assembly from the drive assembly. This action results whether or not the control member is allowed to rotate about the driven shaft 8 or is locked with respect thereto. The control member functions only to effect or change the operation of the clutch mechanism when the rotation imparting force is applied to the driven assembly 7 from a source other than the drive assembly 2.

For example, let it be assumed that the drive wheel 4 is either disconnected from a driving force or is being rotated in a direction which tends to expand the spring clutch section 46. In the latter example, of course, the driven assembly 7 is uncoupled from the drive assembly 2. Let us further assume that the control member wheel 27 is locked against rotation by the engagement of the friction head 32 with the control member wheel 27. If the driven wheel 16 is then rotated in a direction which would tend to contract that portion of the clutch spring which surrounds the driven assembly drum 20, which would be a clockwise rotation of the driven wheel 16 as viewed from the left hand end of Fig. 1, the rotary motion of the driven assembly drum 20 would not be coupled to the drum 6 of the drive assembly. This is so because of the reverse winding of the spring section 48 surrounding the then stationary drum 24. This clockwise rotation of the wheel 16 also contracts the spring section 48 about the control member drum 24 which prevents the spring section 46 from rotating with the drum 20.

Rotation of the driven pulley wheel 16 in the opposite direction would tend to expand or loosen the engagement between the clutch spring section 46 and the driven assembly drum 20 so that the driven assembly 7 is uncoupled from the drive assembly 2.

If for some reason it is desired to couple the motion of the shaft 8 to the so-called drive wheel 4, then the projecting portion 43 of the cam 41 is rotated out of contact with the lever arm 34 so that the spring 39 pulls the friction head 32 out of contact with the wheel 27. Then the tightening of the reversely wound spring section 48 about the control member drum 24 will not have the braking effect above described and the spring section 46 will contract about both drive and driven assembly drums 6 and 20 to couple rotary motion from the drum 20 to the drum 6. Obviously, where this coupling action is desired, the drive assembly 4 should be disconnected from another drive source to prevent interference between the drive and driven ends of the clutch transmission. Another suitably placed unidirectional clutch (not shown) could be used for this purpose.

As above stated, if desired, the rotation of the cam 41 may be controlled in any definite predetermined sequence so that the drive assembly 4 will be uncoupled from the driven assembly 7 during a portion of the rotation of the driven assembly. Speed reduction or lost motion action may be effected in this manner. Also, where coupling of the motion of the driven wheel 16 to the drive wheel 4 is not desired, the control assembly 22 and brake assembly 30 may be replaced by a permanently stationary drum surface like 24 which is attached to the stationary bracket 14.

Refer now to the embodiment shown in Fig. 5. In this embodiment, rotation of the drive assembly 2' in either direction will impart rotation to the driven assembly 7'. Furthermore, rotation of the driven assembly 7' in either direction will not be coupled to the drive assembly 2'. It should be noted that in the embodiment of the invention shown in Fig. 1, rotation of the drive assembly 2 in one direction, the clockwise direction, would not be coupled to the driven assembly by the clutch spring.

The drive assembly 2' includes the drive wheel 4 and connected hollow clutch-spring-receiving drum portion 6'—6' projecting from both sides of the drive wheel 4.

The drive assembly 2' includes the drive wheel 4 and identical stationary bearing arms 12a—12a, the latter also including stationary hubs or drums 24'—24' extending inwardly from the bearing arms and surrounding the shaft 8'. The shaft 8' carries two spaced apart drums 20'—20' which are respectively interposed between the stationary drums 24'—24' and the drive assembly drums 6'—6'. The drums 6'—6', 20'—20' and 24'—24' are cylindrical surfaces of approximately the same diameter and are centered about the axis of rotation of the shaft 8'. The drive assembly 2' including the drive wheel 4 and the drums 6'—6' are rotatably mounted about the intermediate portion 9 of the driven shaft 8'. The drum surfaces to the left of the drive wheel 2' are surrounded by a clutch spring 44' having a spring section 46' surrounding the drive and driven assembly drums 6' and 20' and the reversely wound section 48' which surrounds the stationary drum 24'. The two spring sections are illustrated as being formed from a single piece of spring wire and are joined by a fold 50.

A second clutch spring 44'' is interposed on the drum surfaces to the right of the drive pulley 4 and includes a spring section 46'' winding in the same direction as the spring section 46' just described, and which surrounds the drive and driven assembly drums 6' and 20'. The clutch spring 44'' also includes a reversely wound spring section 48'' which surrounds only the stationary drum 24'. It can be seen that with the above construction, rotation of the drive pulley in either direction will be transmitted to the driven shaft 8' respectively by the clutch springs 44' and 44''. Rotation of the driven assembly 7' in either direction will not be coupled to the drive assembly.

Refer now to Fig. 6 showing an electric screw driver incorporating the unidirectional clutch of the invention. The drive shaft 53 is connected to a portable electric motor (not shown) and it carries a collet 55 on the end thereof which is adapted to receive removably the clutch assembly 1a. The clutch assembly has a shaft 8a fitting into the collet jaws. The shaft has an enlarged cylindrical clutch spring receiving drum 20a intermediate its ends.

Rotatably mounted about the left hand end of the shaft 8a is a control part 30a having a sleeve portion 27a and a cylindrical clutch spring receiving portion 24a of the same diameter as the shaft portion 20a.

Rotatably mounted on the end of the clutch shaft 8a is a collar member 2a having a cylindrical clutch spring receiving neck portion 6a of the same diameter as the portions 24a and 20a, and a threaded head portion 56 which threadedly receives a tool head part 57 which removably receives a screw driver shank 59. A spiral spring 44a snugly surrounds the three clutch spring receiving portions 24a, 20a and 6a. The spring has two oppositely wound sections, one section surrounding the portions 6a and 20a and the other portion surrounds the portion 24a. When rotation is imparted to the collet 55 in a direction which tends to contract the spring around the portion 6a, rotation will be imparted to the tool head 57 and screw driver shank 59. The tool head can be stopped or uncoupled from the shaft 8a by manually holding the sleeve 27a against rotation.

It should be understood that numerous modifications may be made of the embodiment of the invention above described without deviating from the broader aspects of the invention.

I claim:

1. Clutch mechanism comprising a first rotatably mounted member having a clutch spring receiving surface, a second rotatably mounted memer having a clutch spring receiving surface, means forming a clutch spring receiving brake surface on one side of said clutch spring receiving surfaces, one of the latter surfaces being thereby disposed between the other of said latter clutch spring receiving surfaces and the brake surface, a spirally wound clutch spring surrounding all three of said clutch spring receiving surfaces, said clutch spring having two oppositely wound sections, one of said sections surrounding the clutch spring surfaces of both of said rotatably mounted members, and the other oppositely wound clutch spring section disposed around said clutch spring receiving brake surface, whereby the clutch spring receiving surface disposed between the other clutch spring receiving surfaces may be driven in either direction without transmission of motion to the other rotatable clutch spring receiving surface.

2. Clutch mechanism comprising a first rotatably mounted member having a rotatable clutch spring receiving surface centered with respect to the axis of rotation of said first member, a second rotatably mounted member disposed for rotation with respect to said first member and having a rotatable clutch spring receiving surface centered with respect to said axis of rotation, means forming a stationary clutch spring receiving surface mounted to one side of said rotatable surfaces, one of said rotatable clutch spring receiving surfaces being thereby disposed between the other clutch spring receiving surfaces, said clutch spring receiving surfaces being coaxial cylindrical surfaces of substantially the same diameter and being in contiguous end to end relation, a spirally would clutch spring of substantially uniform dimeter frictionally surrounding all three of said cylindrical surfaces, said clutch spring having two oppositely wound sections, one of said sections surrounding only the rotatable cylindrical surfaces, and the other oppositely wound clutch spring section disposed around only said stationary cylindrical surface, whereby said rotatable cylindrical surface disposed between said other cylindrical surfaces may be driven in either direction without transmission of motion to the other rotatable cylindrical surface, and the other rotatable cylindrical surface, in one direction of rotation thereof, will transmit motion to the former rotatable cylindrical surface.

3. Clutch mechanism comprising a first rotatably mounted member having a rotatable cylindrical surface centered with respect to the axis of rotation of said first member, a second rotatably mounted member disposed for rotation with respect to said first member and having a rotatable cylindrical surface centered with respect to said axis of rotation, means forming a stationary cylindrical surface coaxial with the other cylindrical surfaces and mounted to one side of said rotatable cylindrical surfaces, one of said rotatable cylindrical surfaces being thereby disposed between the other cylindrical surfaces, a spirally wound clutch spring surrounding all three of said cylindrical surfaces, said clutch spring having two oppositely wound sections, one of said sections surrounding the rotatable cylindrical surfaces and the other oppositely wound clutch spring section disposed around said stationary cylindrical surface, whereby said rotatable cylindrical surface disposed between said other cylindrical surfaces may be driven in either direction without transmission of motion to the other rotatable cylindrical surface, and the other rotatable cylindrical surface, in one direction of rotation thereof, will transmit motion to the former rotatable cylindrical surface.

4. Clutch mechanism comprising a pair of coaxial shaft members supported for rotation one with respect to the other and including respective clutch spring receiving surfaces, a control member mounted for free rotation coaxially with said shaft members and including a clutch spring receiving surface disposed to one side of said contiguous clutch spring receiving surfaces of said shaft members, one of said latter surfaces thereby being between said control member surface and the other shaft member surface, a clutch spring surrounding portions of all three of said clutch spring receiving surfaces, the portion of said clutch spring which surrounds both shaft member surfaces being wound in one direction and the portion of said clutch spring which surrounds the control member surface being wound in the opposite direction, and means for holding the control member against rotation in a direction which would tend to contract the clutch spring against said clutch receiving surfaces when the shaft member surface located between the other shaft member surface and said control member surface is the drive shaft.

5. In combination, a shaft member journalled in two spaced apart, stationary bearing surfaces and including an enlarged portion intermediate said bearing surfaces which enlarged portion forms a clutch spring receiving surface centered with respect to the axis of rotation of the shaft member, a second shaft member rotatably mounted on said shaft member and including a clutch spring receiving surface located contiguous to said clutch spring receiving surface of said first-mentioned shaft member, means forming a stationary clutch spring receiving surface on the side of the former clutch spring receiving surface thereof which is opposite the side facing the latter clutch spring receiving surface, a clutch spring press fitted over said clutch spring receiving surfaces, the portion of said spring which surrounds the clutch spring receiving surfaces of said shaft members being wound in one direction and the portion of said clutch spring which surrounds the stationary clutch spring receiving surface being wound in the opposite direction.

6. In combination, a shaft member journalled in two spaced apart, stationary bearing surfaces and including an enlarged portion intermediate said bearing surfaces which enlarged portion forms a cylindrical clutch spring receiving surface centered with respect to the axis of rotation of the shaft member, a second shaft member rotatably mounted on said shaft member and including a cylindrical clutch spring receiving surface of substantially the same diameter as and located contiguous to said clutch spring receiving surface of said first-mentioned shaft member, a control member rotatably mounted upon said first shaft member on the side of the clutch spring receiving surface thereof which is opposite the side facing the clutch spring receiving surface of said second shaft member, said control member having a cylindrical clutch spring receiving surface contiguous to the clutch spring receiving surface of said first shaft member, a clutch spring press fitted over said clutch spring receiving surfaces, the portion of said spring which surrounds the cylindrical surfaces of said shaft members being wound in only one direction and the portion of said clutch spring which surrounds the control member of the clutch spring receiving surface being wound only in the opposite direction, and means for selectively holding the control member against rotation in a direction which tends to contract the first-mentioned portion of said spring against said shaft member surfaces when said first shaft member acts as a drive shaft.

7. Clutch mechanism comprising a first rotatably mounted shaft member having axially spaced clutch spring receiving surfaces, a second shaft member rotatably mounted coaxially of said first shaft member and having a pair of axially spaced clutch spring receiving drum surfaces which are respectively contiguous to said clutch spring receiving surfaces of said first shaft member, respective means forming a stationary clutch spring receiving drum surface opposite each of said last-mentioned clutch spring receiving drum surfaces so that one of said shaft member surfaces is disposed between the other shaft member surface and said stationary clutch spring receiving surface adjacent thereto, two groups of clutch spring receiving surfaces being formed thereby, a pair of clutch springs respectively surrounding said two groups of clutch spring receiving surfaces, each clutch spring having a portion wound in one direction which surrounds the shaft member surfaces of the associated group and another portion wound in the opposite direction which surrounds the associated stationary clutch spring receiving surface, the portions of said clutch springs wound about the shaft member surfaces being in opposite relation to that rotation of said first shaft member in either direction will cause one of the clutch springs to contract tightly about the clutch spring receiving surface of the other shaft member to transmit rotation thereto, and whereby rotation of the second shaft member in either direction will not result in transmission of motion to said first-mentioned shaft member.

8. Clutch mechanism comprising a pair of coaxially mounted shaft members, one of the shaft members being journalled in spaced bearings and including a pair of axially spaced clutch spring receiving cylindrical drum surfaces centered with respect to the axis of rotation thereof, the other shaft member rotatably mounted on said first shaft member between said axially spaced clutch spring receiving surfaces, said other shaft member having a pair of axially spaced cylindrical clutch spring receiving drum surfaces mounted coaxially of and opposite the clutch spring receiving surfaces of said first shaft member, and respective means forming a stationary cylindrical clutch spring receiving surface contiguous to the bearing facing end of each clutch spring receiving surface of said first shaft member, a first clutch spring surrounding the three contiguous clutch spring receiving surfaces adjacent to one bearing, and a second clutch spring surrounding the three contiguous clutch spring receiving surfaces adjacent to the other bearing, the portions of said clutch springs which surround said cylindrical surfaces of said shaft members winding in the same direction relative to each other and the portion of the clutch springs surrounding said stationary cylindrical surfaces winding in the same direction relative to each other but in opposite direction relative to the winding of the springs surrounding said shaft member clutch spring receiving surfaces.

9. In a spring coupled clutch mechanism, a device having three contiguous coaxial members with clutch spring receiving surfaces, a spiral wound clutch spring formed to fit snugly but with a minimum of initial tension against the three clutch spring receiving surfaces, some coils of said clutch spring being coiled in a right hand helix, the rest of the coils of said clutch spring being coiled in a left hand helix, the coils of one helix being in contact with two adjacent clutch spring receiving surfaces, the coils of the other helix being in contact with the third clutch spring receiving surface.

10. The clutch mechanism of claim 1 wherein said brake surface is mounted for rotational movement with said clutch spring-receiving surfaces, and means for selectively holding said brake surface against rotation.

11. The clutch mechanism of claim 9 wherein all of said coaxial members are mounted for rotation, and means for selectively holding the coaxial member having said third clutch spring-receiving surface against rotation.

References Cited in the file of this patent

UNITED STATES PATENTS

| | | | |
|---|---|---|---|
| 787,788 | Pinard | Apr. 18, | 1905 |
| 1,203,528 | Gardner | Oct. 31, | 1916 |
| 1,300,398 | Jaeger | Apr. 15, | 1919 |
| 1,481,153 | Rosendahl | Jan. 15, | 1924 |
| 2,105,330 | Pagenkopf | Jan. 11, | 1938 |
| 2,458,441 | Starkey | Jan. 4, | 1949 |
| 2,563,302 | Atkinson et al. | Aug. 7, | 1951 |
| 2,603,324 | Pepper | July 15, | 1952 |
| 2,609,702 | Rogers | Sept. 9, | 1952 |
| 2,622,450 | Gorske et al. | Dec. 23, | 1952 |
| 2,626,029 | Gutterman | Jan. 20, | 1953 |
| 2,633,953 | Gorske | Apr. 7, | 1953 |